United States Patent
Boom et al.

(10) Patent No.: US 9,150,097 B2
(45) Date of Patent: Oct. 6, 2015

(54) ADJUSTMENT DEVICE, AIR INLET, AND MOTOR VEHICLE

(71) Applicant: MCi (Mirror Controls International) Netherlands B.V., Woerden (NL)

(72) Inventors: Stephen Alexander George Gustavo Boom, Woerden (NL); Erik Alfred Simeon de Vries, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 14/403,859

(22) PCT Filed: May 30, 2013

(86) PCT No.: PCT/NL2013/050391
§ 371 (c)(1),
(2) Date: Nov. 25, 2014

(87) PCT Pub. No.: WO2013/180569
PCT Pub. Date: Dec. 5, 2013

(65) Prior Publication Data
US 2015/0136500 A1    May 21, 2015

(30) Foreign Application Priority Data
Jun. 1, 2012  (NL) ..................................... 2008922

(51) Int. Cl.
*B60K 11/00*  (2006.01)
*B60K 11/08*  (2006.01)
*H02K 7/116*  (2006.01)
*B60K 11/06*  (2006.01)

(52) U.S. Cl.
CPC ............... *B60K 11/085* (2013.01); *B60K 11/06* (2013.01); *H02K 7/1166* (2013.01)

(58) Field of Classification Search
CPC ....................................................... B60K 11/00
USPC ......................................................... 180/68.1
See application file for complete search history.

(56) References Cited

U.S. PATENT DOCUMENTS

| | | | | |
|---|---|---|---|---|
| 6,142,108 | A * | 11/2000 | Blichmann | 123/41.05 |
| 6,145,251 | A * | 11/2000 | Ricci | 49/82.1 |
| 2006/0104074 | A1* | 5/2006 | Boniface et al. | 362/496 |
| 2011/0246023 | A1* | 10/2011 | Lockwood et al. | 701/36 |
| 2013/0092462 | A1* | 4/2013 | Chinta | 180/68.1 |

FOREIGN PATENT DOCUMENTS

| | | |
|---|---|---|
| EP | 2 371 603 | 10/2011 |
| JP | 1 018744 | 1/1989 |

OTHER PUBLICATIONS

International Search Report from PCT/NL2013/05031 dated Aug. 9, 2013.

* cited by examiner

*Primary Examiner* — John Walters
*Assistant Examiner* — James Triggs
(74) *Attorney, Agent, or Firm* — Swanson & Bratschun, L.L.C.

(57) ABSTRACT

The invention relates to an adjustment device for adjusting shutoff strips of an at least partly closable air inlet of a motor compartment of a motor vehicle between at least a first position in which the shutoff strips leave the air inlet at least partly open and a second position in which the shutoff strips at least partly close the air inlet. The adjustment device comprises a drive unit, situated in a housing, which has a motor and a drive train with reduction stage. The drive train comprises an output shaft provided with a first coupling means facing outside the housing and a second coupling means facing outside the housing, opposite with respect to the first coupling means. The coupling means are configured to cooperate with, respectively, a first and a second coupling element of a first and second set of shutoff strips, respectively, for coupling the output shaft on both sides of the housing to the respective set of shutoff strips.

14 Claims, 4 Drawing Sheets

ADJUSTMENT DEVICE, AIR INLET, AND MOTOR VEHICLE

RELATED APPLICATIONS

This application is a 35 U.S.C. §371 national phase application of PCT/NL2013/050391 (WO 2013/180569), filed on May 30, 2013, entitled "Adjustment Device, Air Inlet, and Motor Vehicle", which application claims priority to Netherlands Application No. 2008922, filed Jun. 1, 2012, which is incorporated herein by reference in its entirety.

The invention relates to an adjustment device for adjusting shutoff strips of an at least partly closable air inlet of a motor compartment of a motor vehicle between at least a first position in which the shutoff strips leave the air inlet at least partly open and a second position in which the shutoff strips at least partly close the air inlet.

A motor vehicle is typically provided with an air inlet comprising one or more air inlet openings. An air inlet is commonly used to cool the motor of the motor vehicle during operation. Air inlets are usually situated at a front of the motor vehicle in front of the motor. Usually, a motor can be cooled by means of a coolant, for example, water or oil. This coolant is cooled with air in a heat exchanger, for instance, in a radiator. The air flowing through the air inlet can be wholly or partly guided to the radiator of the motor compartment of the motor of the motor vehicle to cool the motor indirectly via the coolant. It is known to make an air inlet of a motor compartment of adjustable design, allowing the air inlet to be adjusted between an open position and a closed position. To this end, the air inlet may be provided with adjustment elements, for example, shutoff strips, which can be adjusted, for example, pivoted about an upright or lying axis.

In the closed position of the air inlet the air resistance of the vehicle is lowered, which is usually beneficial to the fuel consumption of the motor. Further, where the efficiency of the motor, fuel consumption and $CO_2$ emission are concerned, a motor of a motor vehicle generally has an optimum operating temperature, which is typically higher than the ambient temperature. A closed air inlet when the motor is cold is then once again beneficial to fuel consumption and/or $CO_2$ emission. Also, during driving with an open air inlet, the temperature of the motor can fall below the optimum operating temperature, so that fuel consumption and/or $CO_2$ emission may increase. Also at an operating temperature above the optimum operating temperature, fuel consumption and/or $CO_2$ emission of the motor may increase.

It can hence be advantageous to make an air inlet opening of adjustable design. To this end, the air inlet is usually coupled with an adjustment device which comprises a drive unit. With the aid of the drive unit the air inlet can at least partly be closed and at least partly be opened. When, for instance, in the case of a closed air inlet the operating temperature of the motor runs up too high, the air inlet can at least partly be opened again to provide for sufficient cooling.

There are, for instance, motor vehicles known having an air inlet at the front of the vehicle, the air inlet having a left and a right air inlet opening which are both provided with a set of strips. The two sets of strips can each be driven by a separate drive unit. A disadvantage of such separately driven sets of strips is that it is difficult to neatly adjust the two sets of strips synchronously, for instance, resulting from differences between the output power of the two driving units and/or due to tolerance differences of small electric motors used, etc. When strips are not neatly adjusted synchronously, it may happen that the front view of the motor vehicle gives a relatively asymmetrical impression. This may be experienced as less pretty. Also, as a consequence, cooling of the motor may be less optimal. In addition, due to this, it may happen that the air inlet openings do not both of them close or open completely.

Also, there are motor vehicles known having a left and a right air inlet opening which are both provided with a set of shutoff strips, while a drive unit has an output shaft which is coupled to a first of the two sets. The second set of strips is then coupled via a U-shaped bridge profile to the first set and can thus follow the adjustments of the first set. A disadvantage of such sets of strips connected via a bridge construction is, for instance, that the bridge construction takes up a lot of room, typically in the middle of the grille of the vehicle. As a result, the air inlet openings may end up relatively far apart, which may be disadvantageous for the operation and/or the efficiency of the radiator. Also, for instance in connection with a desired, often characteristic design of the grille, and/or in connection with the placement of equipment such as odometers, relatively little room may be available for such a bridge construction in the middle of a grille. Moreover, such a bridge construction is relatively complex and susceptible to malfunction.

An object of the invention is to provide an adjustment device which counteracts at least one of the above-mentioned disadvantages.

To this end, the adjustment device is provided with a housing and with a drive unit situated in the housing for adjusting the shutoff strips between at least the first position and the second position, wherein the drive unit comprises a motor and a drive train with reduction stage, wherein the drive train comprises an output shaft which is provided with a first coupling means facing outside the housing and a second coupling means facing outside the housing, opposite with respect to the first coupling means, wherein the first and second coupling means are configured to cooperate with, respectively, a first and a second coupling element of a first and second set of shutoff strips, respectively, for coupling the output shaft on both sides of the housing with the first and second set of shutoff strips, respectively.

By providing the output shaft of the drive train of the drive unit with a first as well as a second coupling means facing outside the housing, while the first and second coupling means are opposite to each other, two sets of strips on both sides of the adjustment device can be coupled to a single adjustment device. In this way, during use of the adjustment device two sets of strips can be synchronously adjusted by the drive unit. Also, by the use of a single adjustment device, installation room can be saved, so that, for instance in the middle of the grille of a car, relatively much space is left for other equipment. Moreover, the use of a bridge that couples a first set of strips to a second set of strips can be omitted, or the use of two separate drive units is not necessary. This can save space. Moreover, this can give designers a greater freedom of design and greater flexibility.

By having the first and the second coupling means extend substantially concentrically with respect to each other, an adjustment device can be obtained that is relatively simple to fit into a grille of a substantially symmetrical design. Moreover, such an advantageous adjustment device can relatively simply be synchronously coupled to two sets of shutoff strips.

By providing opposite walls of the housing with openings, in a simple manner the first and the second coupling elements can be connected through the openings with the first coupling means and the second coupling means.

Advantageously, the first coupling means and the second coupling means may be integrated. For instance, the first coupling means can form a first socket and the second coupling means can form a second socket in the output shaft. When integrated, the first socket and the second socket can form a through-hole in the output shaft. For instance, the first coupling means can be a snap finger, which extends substantially transversely to the output shaft, and the second coupling means can be a snap finger. When integrated, the first and the second coupling means can be a pin extending through the output shaft, having on both ends a snap finger, or thread or the like.

By providing the first coupling means with a first socket for receiving a first coupling element and providing the second coupling means with a second socket for receiving a second coupling element, while the first and the second socket are integrated with each other to form a through-hole extending through the output shaft, for receiving an integrated first and second coupling element, such as an insertion shaft, the adjustment device can relatively simply be synchronously coupled to two sets of shutoff strips. Moreover, in this way, an adjustment device can be obtained that is relatively easy to build in, as well as relatively simple to manufacture and assemble.

By advantageously having the drive train comprise a compound drive system, not only can the drive unit be made of relatively compact design, so that the adjustment device can be configured with a relatively low overall height—which is many cases extends in the width direction of a motor vehicle—but also the output shaft can be positioned relatively centrally in the drive train, which can afford designers still greater freedom of design and flexibility.

Moreover, by providing a compound drive system, in a relatively compact manner a relatively high transmission ratio can be achieved. As a consequence, a relatively small electric motor can be used. This, too, can render the overall dimensions favorable.

It is noted that the drive train may be formed as the compound drive system. Alternatively, the drive train can comprise the compound drive system and further also other parts. The compound drive system can comprise, for instance, a compound planetary gear system, a harmonic-drive drive system or a planetary gear system having several planets. The output shaft of the drive train can be or comprise, for instance, an output shaft of the compound drive system. Also, the output shaft of the drive train can be or comprise, for instance, an output shaft of a planetary gear system. Also, an output shaft of the drive train may be coupled to the output shaft of the compound drive system.

Further, the invention relates to an adjustment system provided with an adjustment device and to an air inlet provided with an adjustment device.

Furthermore, the invention relates to a motor vehicle provided with a motor compartment having an at least partly closable air inlet provided with such an adjustment device and/or such as adjustment system.

Further advantageous embodiments of the invention are represented in the subclaims.

The invention will be further elucidated on the basis of exemplary embodiments which are represented in the drawings. In the drawings.

It is noted that the drawing figures are merely shown by way of schematic representations of exemplary embodiments of the invention and should not in any way be regarded as limiting. In the figures, like or corresponding parts are denoted with like or corresponding reference numerals.

Figure 1:
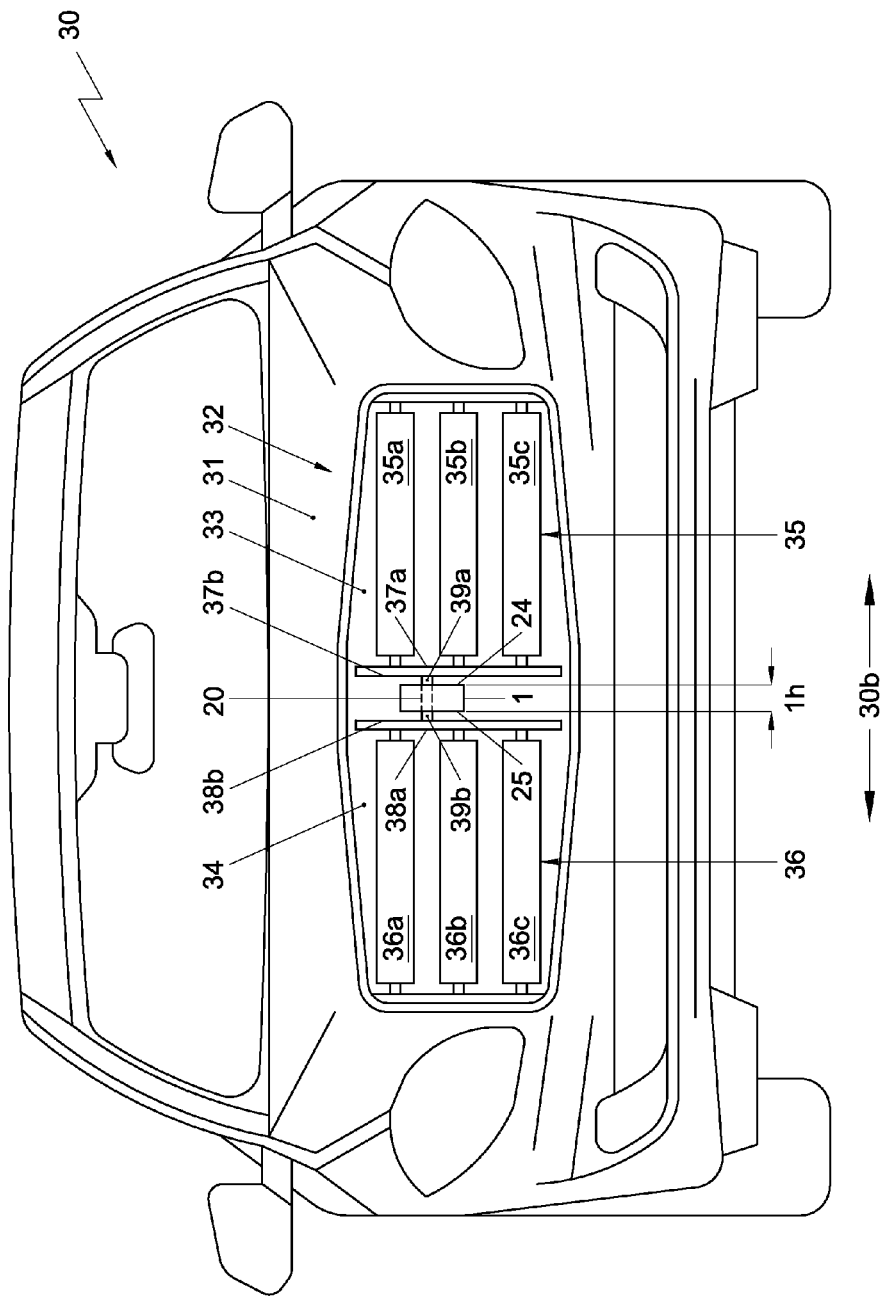
FIG. 1 shows a perspective front view of a partly cutaway motor vehicle according to an aspect of the invention.

FIG. 1 shows a perspective front view of a partly cutaway motor vehicle 30. The motor vehicle 30 is here a passenger car 30, but may alternatively be, for example, a truck, bus, van, tractor, or camper.

The vehicle 30 is provided with a motor compartment 31 having an at least partly closable air inlet 32. The air inlet 32 comprises a first air inlet opening 33 and a second air inlet opening 34. It is noted that the air inlet can also comprise a different number of openings, for example, one, four, or six air inlet openings. Here, the first air inlet opening 33 is a left air inlet opening 33 and the second opening 34 a right air inlet opening 34. Alternatively or additionally, the air inlet openings may be positioned at least partly above each other.

The first air inlet opening 33 is provided with a first set 35 of shutoff strips 35a-35c and the second air inlet opening 34 is provided with a second set 36 of shutoff strips 36a-36c. The strips 35a-c, 36a-c may be tiltable. Preferably, the strips of a set are mutually coupled such that the strips of the respective set can be jointly adjusted. It is noted that both sets 35, 36 here comprise three strips 35a-c, 36a-c. Alternatively, a set can also comprise a different number of strips, for example, two, four, five, six, or eight strips. It is further noted that the sets 35, 36 can also comprise mutually different numbers of strips.

Further, the air inlet 32 is provided with an adjustment device 1. Here, the adjustment device 1 is configured to cooperate with a first and a second coupling element 37, 38 of the first and second set 35, 36 of shutoff strips, respectively, for coupling an output shaft 20 of the adjustment device 1 on both sides 24, 25 of a housing 3 of the adjustment device 1 to the first and second set 35, 36 of shutoff strips, respectively.

For instance, the first and/or the second coupling element 37, 38 is formed by a rotary shaft of one of the strips of the respective set. Alternatively, the coupling element comprises one or more other parts. Thus, in FIG. 1, both the first and the second coupling element 37, 38 are integrally formed by a substantially elongated insertion shaft 39. The insertion shaft 39 is coupled with the output shaft 20 of the adjustment device 1 and projects by a first end 39a on a first side 24 of the adjustment device 1. By a second end 39b the insertion shaft 39 projects on a second side 25 of the adjustment device 1.

The coupling element 37, 38 may be connected with the set of strips directly or indirectly. Here, the coupling element is indirectly coupled to the shutoff strips. In fact, the ends of the insertion shaft 39 are here provided with a gear 37a, 38a which engages a gear rack 37b, 38b. The gear rack 37b, 38b in turn may be coupled again to each of the strips of the set. For instance, a rotary shaft of the strips may be provided with a toothing that engages the gear rack. Alternatively, for instance, a protrusion of a strip may extend into an opening in the gear rack 37b, 38b, and the opening can form a point of rotation of a four-bar mechanism for adjusting the strips 35a-c, 36a-c.

Alternatively, the coupling element 37, 38 can be, for instance, an integral part of a strip 35a-c, 36a-c.

Figure 2:
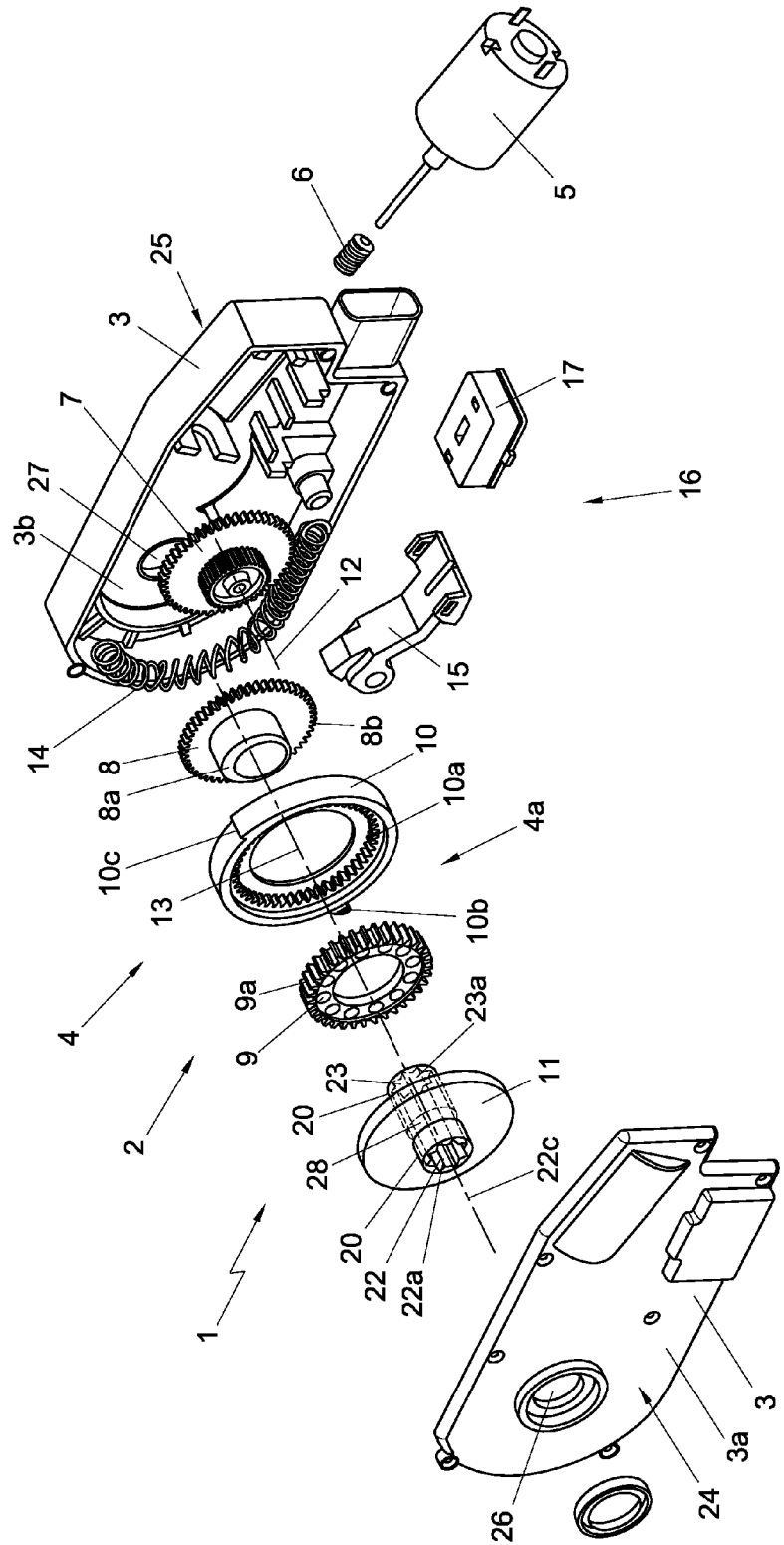
FIG. 2 shows a perspective exploded view of a first exemplary embodiment of an adjustment device according to an aspect of the invention.
Figure 3:
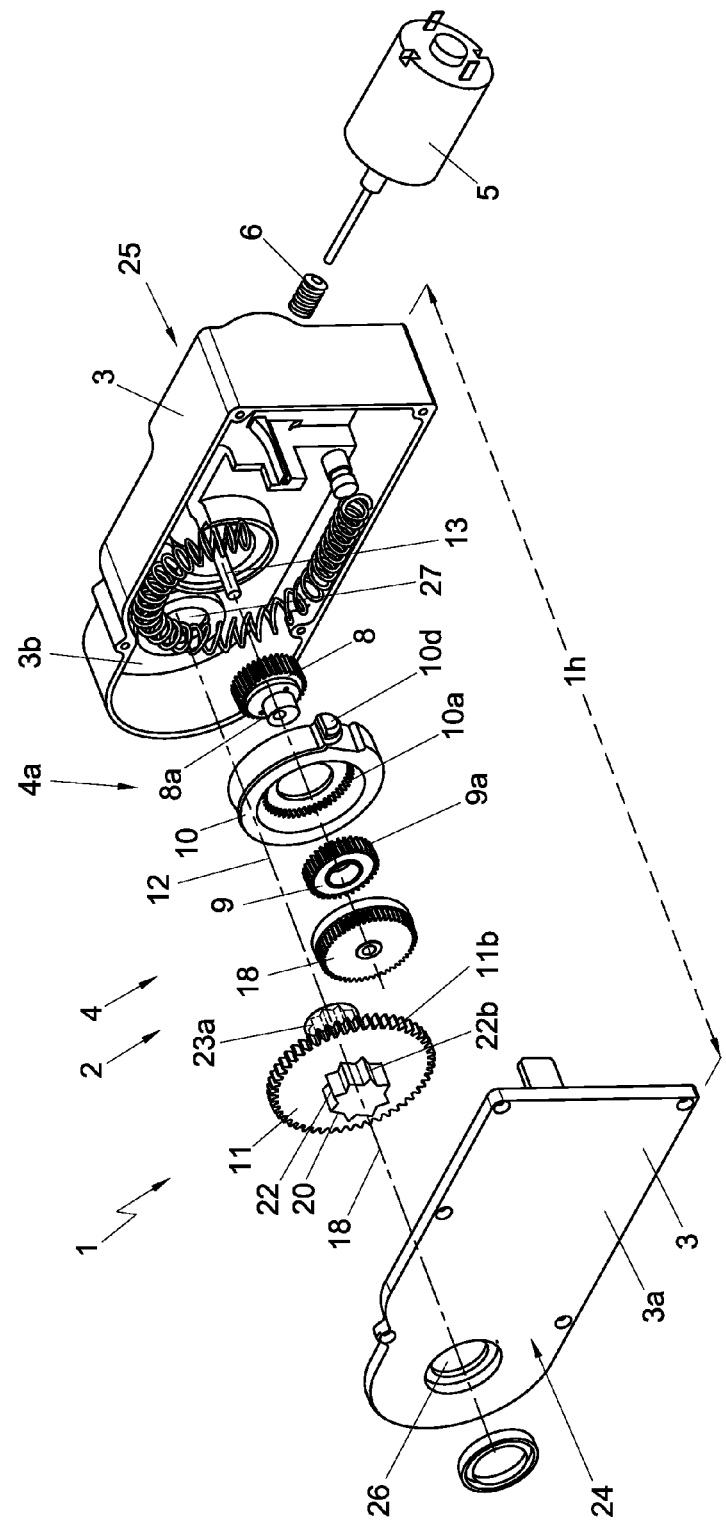
FIG. 3 shows a perspective exploded view of a second exemplary embodiment of an adjustment device according to an aspect of the invention.
Figure 4:
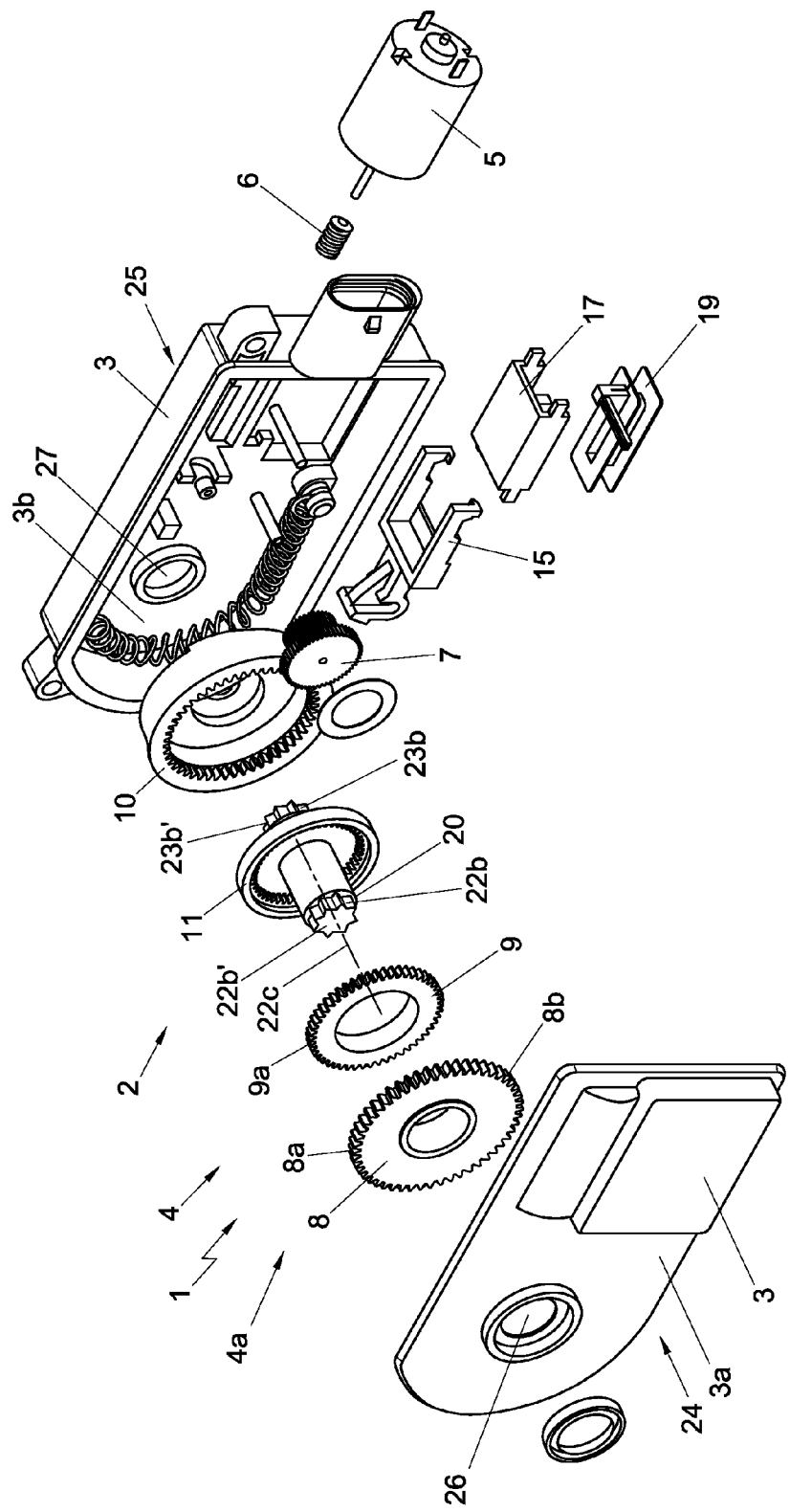
FIG. 4 shows a perspective exploded view of a third exemplary embodiment of an adjustment device according to an aspect of the invention.

FIGS. 2-4 show perspective exploded views of a first, second, and third exemplary embodiment, respectively, of an adjustment device 1 according to an aspect of the invention. Here, the adjustment device 1 is configured for adjusting shutoff strips 35a-c, 36a-c of an at least partly closable air inlet 32 of a motor compartment 31 of a motor vehicle 30 between at least a first position in which the shutoff strips 35a-c, 36a-c leave the air inlet 32 at least partly open and a second position in which the shutoff strips 35a-c, 36a-c at least partly close the air inlet 32. The adjustment device 1 comprises a housing 3.

Further, the adjustment device 1 comprises a drive unit 2 situated in the housing 3, for adjusting the shutoff strips 35a-c, 36a-c between at least the first position and the second position. The drive unit 2 comprises a motor 5 and a drive train 4 with at least one reduction stage. Advantageously, the motor 5 is an electric motor 5 which can be connected with the power circuit of the motor vehicle 30. Other implementations of the motor 5 are also possible.

According to a preferred embodiment of the invention, the drive train 4 comprises a compound drive system 4a. The drive train 4 preferably comprises a number of cooperating wheels 6, 7, 8, 9, 10, 11, 18 which may be provided with internal and/or external toothing 8a, 9a, 10a, 11b.

In FIG. 2 and FIG. 4 the compound drive system 4a comprises, for example, a worm wheel 6 and a compound planetary gear system 4a comprising four gearwheel parts 8, 9, 10, 11. Owing to the compound planetary gear system 4a the drive unit 2 can have a relatively high transmission ratio and in addition the drive unit 2 can be relatively compact. The adjustment device 1 can hence have a relatively low overall height 1 h. After the adjustment device 1 is built into a motor vehicle 30, the overall height 1 h in many cases extends in the width direction 30b of the motor vehicle 30.

Alternatively, the compound drive system 4a can comprise, for example, a harmonic-drive system or a planetary gear system having several planets.

The drive train 4 comprises an output shaft 20, which, for instance, as can be seen in FIG. 2 and FIG. 4, may be formed by an output wheel 11 of the drive system 4a. Also, the output shaft 20, as can be seen in FIG. 3, can be formed by a wheel 11 coupled to an output shaft of the drive system 4a. The output shaft 20 of the drive train 4 forms in FIGS. 2-4 a drive wheel 11 which can drive the strips to be adjusted.

The output shaft 20 is provided with a first coupling means 22 facing outside the housing 3 and a second coupling means 23 facing outside the housing 3, opposite with respect to the first coupling means 22. The first and second coupling means 22, 23, respectively, is configured to cooperate with a first and second coupling element 37, 38, respectively, of a first and second set 35, 36 of shutoff strips, respectively, for coupling the output shaft 20 on both sides 24, 25 of the housing 3 to the first and second set 35, 36 of shutoff strips, respectively.

Preferably, the coupling means 22, 23 is substantially elongated. Additionally, the coupling means 22, 23 preferably has a cross section that remains substantially equal.

Preferably, the coupling means 22, 23 has a central axis which extends substantially parallel to the central axis 22c of the output shaft 20. Alternatively, depending on the manner of coupling between the output shaft and the respective set of strips, the central axis of the coupling means 22, 23 can be substantially at an angle to the central axis of the output shaft 20.

In the exemplary embodiment shown in FIG. 2, the first and the second coupling means 22, 23 extend substantially concentrically with respect to each other. What can thus be promoted is that two substantially symmetrically designed sets 35, 36 of strips on both sides 24, 25 of the housing 3 can be relatively simply coupled to the respective coupling means 22, 23. What can thus be prevented, for instance, is that during the assembly of a motor vehicle relatively many steps are required for synchronous setting of the two sets 35, 36 of strips.

Most preferably, both the first coupling means 22 and the second coupling means 23 extend substantially concentrically with respect to the output shaft 20. This is to say that the central axis of the output shaft 20 and the central axes of the two coupling means 22, 23 substantially coincide.

In the exemplary embodiments shown, the housing 3 comprises at least a first and a second wall part 3a, 3b. The first wall part 3a comprises a first opening 26 and the second wall part 3b comprises a second opening 27. The second opening 27 is placed substantially opposite the first opening 26. The first coupling means 22, viewed in axial direction of the output shaft 20, extends at least partly towards the first opening 26. The second coupling means 23, viewed in axial direction of the output shaft 20, extends at least partly towards the second opening 27. One or both coupling means 22, 23 can extend to outside the housing 3. Thus, coupling with the sets of strips can be effected relatively simply.

The example shown in FIG. 2 is an adjustment device 1 corresponding to the adjustment device 1 shown in FIG. 1. The first coupling means 22 here comprises a first socket 22a for receiving a coupling element 39. As a coupling element whereby the first coupling element is integrated with the second coupling element, use can for instance be made of an insertion shaft 39 which can be coupled with the coupling means 22 by inserting it into the socket 22a. Optionally, the insertion shaft may be fixed, for instance, with the aid of glue and/or other fixing means, such as a set screw.

Furthermore, the second coupling means 23 comprises a second socket 23a for receiving a coupling element 39, such as an insertion shaft 39.

In the example shown in FIG. 2, the first and the second socket 22a, 23a are mutually integrated to form a through-hole 28 extending through the output shaft 20, for receiving a coupling element 39, such as an insertion shaft 39. During installation of the adjustment device 1 in a motor vehicle 30, for instance on a first side 24 of the housing 3 a first insertion shaft 39 can be inserted into the first socket 22a and on the other side 25 of the housing 3 a second insertion shaft 39 can be inserted into the second socket 22b. Alternatively, a single insertion shaft may be used which preferably extends through the housing 3 and projects on either side 24, 25 of the housing 3.

In the depicted example of FIG. 3, the first coupling means 22 comprises a first coupling shaft 22b for coupling with a first set 35 of shutoff strips. The coupling shaft 22b may, for instance, be coupled to the first set 35 by inserting the coupling shaft 22b into a first coupling element 37 of the first set 35 or by sliding the coupling element 37 onto the coupling shaft 22b.

Here, the second coupling means 23 comprises a socket 23a. Alternatively or additionally, the second coupling means 23 can comprise a coupling shaft 23b for coupling with a second set 36 of shutoff strips. Thus, FIG. 4 shows an adjustment device 1 with an output shaft 20 which is provided with two coupling shafts 22b, 23b.

It is noted that the output shaft which is provided on both sides with a coupling means 22, 23 can also have additional coupling means. For instance, the first and/or the second coupling means may be of double design. Thus, a coupling means 22, 23 implemented as a projecting coupling shaft 22b, 23b may further be provided with a coupling socket 22a, 23a provided in the coupling shaft 22b, 23b. Additionally or alternatively, a coupling shaft may be provided with an additional coupling shaft (not shown) extending away from its outermost end, most preferably one having a lesser diameter than that of the respective coupling shaft.

Most preferably, the first and/or second coupling shaft 22b, 23b extends through the respective opening 26, 27 in the respective wall part 3a, 3b to outside the housing 3. Thus, a coupling with the first 35 and the second set 36 of strips can be effected relatively simply.

In the examples shown, both the first and the second coupling means 22, 23 have a nonround cross section. By providing a nonround cross section, relatively simply a detachable coupling can be provided between the respective coupling means 22, 23 and the coupling element 37, 38 of the respective set 35, 36 of strips.

Preferably, the nonround cross section remains equal throughout the length of the coupling means. It is noted that the coupling means 22, 23, for instance if it comprises a coupling shaft 22b, 23b, can taper in the direction of its end 22b', 23b' facing outside the housing 3. What can thus be promoted is that a substantially play-free coupling can take place between the coupling means and the coupling element 37, 38 of the respective set 35, 36 of strips. Alternatively, the coupling means 22, 23, for instance if it comprises a coupling socket 22a, 23a, can taper from its ends 22b', 23b' facing outside the housing 3, in inward direction at least over a portion of its length. In this way, for instance, there can be provided a locating entrance of the socket, so that insertion of an insertion shaft can take place relatively simply, while further down in the socket the insertion shaft can be clamped substantially without play.

The nonround cross section of the coupling means 22, 23 in the examples shown has a substantially polygonal cross section. Thus, it can be seen that the coupling shaft 22b in FIG. 3 has a star-shaped cross section. The cross section can have the shape of an equilateral polygon or star. Thus, the cross section can be, for example, a substantially equilateral and equiangular triangle, square, hexagon or octagon, or a three-, four-, five-, six-, eight-, ten- or twelve-pointed star. Alternatively, the nonround cross section can also have a different shape, for example, the cross section can be substantially elongate and, for example, be oblong or elliptic.

The invention is not limited to the exemplary embodiments represented here. The adjustment device 1 has been described above on the basis of a drive train 4 which comprises a compound drive system 4a, which in this exemplary embodiment comprises a planetary gear system, but alternatively the drive system 4a can also comprise a planetary gear system having several planets or a harmonic-drive drive system. Many variants are possible and will be clear to one skilled in the art. Thus, the adjustment device 1 can comprise, for example, a fail-safe construction 16, of which various parts 10b-d, 14, 15, 17, 19 are placed in the housing 3 of the adjustment device. Such variants are understood to be within the scope of the following claims.

The invention claimed is:

1. An adjustment device for adjusting shutoff strips of an at least partly closable air inlet of a motor compartment of a motor vehicle between at least a first position in which the shutoff strips leave the air inlet at least partly open and a second position in which the shutoff strips at least partly close the air inlet, comprising:
    a housing; and
    a drive unit situated in the housing for adjusting the shutoff strips between at least the first position and the second position, wherein the drive unit comprises a motor and a drive train with reduction stage, wherein the drive train comprises an output shaft which is provided with a first coupling means facing outside the housing and a second coupling means facing outside the housing, opposite with respect to the first coupling means, wherein the first and second coupling means are configured to cooperate with, respectively, a first and a second coupling element of a first and second set of shutoff strips, respectively, for coupling the output shaft on both sides of the housing to the first and second set of shutoff strips, respectively.

2. The adjustment device according to claim 1, wherein the first and the second coupling means extend substantially concentrically with respect to each other.

3. The adjustment device according to claim 1, wherein the housing comprises at least a first wall part and a second wall part opposite with respect to the first wall part, wherein the first wall part comprises a first opening and the second wall part comprises a second opening, wherein the first coupling means, viewed in axial direction of the output shaft, extends at least partly towards the first opening and the second coupling means, viewed in axial direction of the output shaft, extends at least partly towards the second opening.

4. The adjustment device according to claim 1, wherein the first coupling means and the second coupling means are integrated with each other in the output shaft.

5. The adjustment device according to claim 4, wherein the integrated first and second coupling means form a hole through the output shaft.

6. The adjustment device according to claim 1, wherein at least one of the first or the second coupling means has a non-round cross section.

7. The adjustment device according to claim 1, wherein the drive train comprises a compound drive system.

8. The adjustment device according to claim 7, wherein the compound drive system comprises a compound planetary gear system.

9. An adjustment system for adjusting shutoff strips of an at least partly closable air inlet of a motor compartment of a motor vehicle, comprising an adjustment device according to claim 1, furthermore comprising a first coupling element for coupling with the first coupling means on one side and with the first set of shutoff strips on the other side and comprising a second coupling element for coupling with the second coupling means on one side and with the second set of shutoff strips on the other side.

10. The adjustment system according to claim 9, wherein the first coupling element comprises a first coupling shaft for, on one side, coupling with the first coupling means and, on the other side, coupling with the first set of shutoff strips and wherein the second coupling element comprises a second coupling shaft for, on one side, coupling with the second coupling means and, on the other side, coupling with the second set of shutoff strips.

11. The adjustment system according to claim 10, wherein at least one of the first or second coupling shafts extends through the first opening and second opening, respectively, in the first wall part and the second wall part, respectively, to outside the housing.

12. The adjustment system according to claim 10, wherein the first coupling means and the second coupling means are integrated with each other and the first coupling element and the second coupling element are integrated to form an insertion shaft which extends through a hole of the integrated first and second coupling means.

13. An air inlet provided with at least one of an adjustment device according to claim 1 or with an adjustment system according to claim 9.

14. A motor vehicle provided with a motor compartment having an at least partly closable air inlet, the air inlet comprising at least one of an adjustment device according to claim 1 or an adjustment system according to claim 9.

* * * * *